(12) United States Patent
Sheefel

(10) Patent No.: US 8,608,253 B1
(45) Date of Patent: Dec. 17, 2013

(54) LOCKING HUB

(75) Inventor: Adam Sheefel, Warsaw, IN (US)

(73) Assignee: Custom Engineered Wheels, Inc., Warsaw, IN (US)

( * ) Notice: Subject to any disclaimer, the term of this patent is extended or adjusted under 35 U.S.C. 154(b) by 286 days.

(21) Appl. No.: 13/104,263

(22) Filed: May 10, 2011

(51) Int. Cl.
  *B60B 27/02* (2006.01)
  *B60B 37/10* (2006.01)
  *B60B 7/08* (2006.01)

(52) U.S. Cl.
  USPC .............. 301/105.1; 301/108.1; 301/111.03

(58) Field of Classification Search
  USPC .......... 301/111.01, 111.03, 111.04, 111.05, 301/111.07, 112, 120, 122, 108.1, 108.2
  See application file for complete search history.

(56) References Cited

U.S. PATENT DOCUMENTS

| | | | |
|---|---|---|---|
| 121,841 A | 12/1871 | Berndt et al. | |
| 5,143,427 A * | 9/1992 | Dick | 301/111.01 |
| 5,716,107 A * | 2/1998 | Parker et al. | 301/111.07 |
| 5,902,018 A * | 5/1999 | Owen et al. | 301/111.04 |
| 6,508,518 B1 * | 1/2003 | Owen et al. | 301/111.03 |
| 6,637,835 B2 * | 10/2003 | Morris | 301/111.01 |
| 6,938,964 B2 * | 9/2005 | Flood et al. | 301/119 |
| 7,108,335 B2 * | 9/2006 | Morris | 301/111.01 |
| 7,445,297 B2 * | 11/2008 | Mercier et al. | 301/111.04 |
| 2005/0179313 A1 * | 8/2005 | Liu | 301/111.01 |

\* cited by examiner

*Primary Examiner* — Kip T Kotter
*Assistant Examiner* — Jean Charleston
(74) *Attorney, Agent, or Firm* — Botkin & Hall, LLP; Michael D. Marston

(57) ABSTRACT

A locking hub that is useful for wheels on small vehicles. Such wheels may use a press fit or integrally cast version of the invention. The locking hub fits over a shaft. The hub has a bore for receiving the end of the shaft. An outer member is connected to and spaced from the hub. A finger is adjacent to the bore and has a protrusion that extends into the bore. The finger is resilient and movable between a first and second position. The first position has the protrusion protruding into the bore and the second position has the protrusion outside of the bore with the finger being bent radially outward. The shaft has a notch or hole that receives the finger. A locking device may selectively be placed between the outer member and the hub to prevent the finger from moving into its second position, thereby locking the hub onto the shaft.

14 Claims, 9 Drawing Sheets

US 8,608,253 B1

LOCKING HUB

BACKGROUND OF THE INVENTION

Presently, wheels for small vehicles such as garbage cans or carts are difficult to remove and maintain. Typically, wheels are installed in such a way as to be nearly permanent without the use of special tools to remove the wheel. Some wheels use a one way cantilevered catch having a protrusion that is chamfered in the direction of installation and sharp on the direction to pull the wheel off. The chamfer catches in a notch near the end of the axle. To remove such a wheel one would need a screwdriver or other object to pull the catch outward to remove the wheel. The use of cotter pins may also secure a wheel, but again requires a tool to remove the wheel.

Ideally, wheels for small vehicles should be easily installed and removed without tools. This is particularly important for garbage cans. Typically, aside from wheels, garbage cans are shaped so they can be nested within each other. If wheels can be easily removed, the cans could be stacked in a small space, with the wheels being stored in the innermost can. Upon delivery to its final location, the wheels could be installed on the can. Easily changeable wheels would also make maintenance simple. Modern plastic garbage cans are usually tough enough to take many years of abuse. However, protruding wheels are vulnerable to damage or wear as the moving part of the can that supports the weight of the can and its contents. If a wheel becomes damaged throughout the life of a garbage can, the entire can does not have to be replaced. A replacement wheel or wheels, with simple instructions, could be shipped and installed on the garbage can, possibly even by an end user of the garbage can.

SUMMARY OF THE INVENTION

The present invention is a locking hub that may be used for a wheel. The wheel may have a press fit locking hub, or the hub may be integrally cast into the wheel. The locking hub has a hub for fitting over an end of a shaft. The hub has a bore with an inner diameter for receiving a shaft and an outer surface. An outer member may be connected to and spaced from said hub. A finger is adjacent to the bore and has an inner surface and an outer surface. The finger includes a protrusion that has a raised surface relative to the inner surface of the finger. The finger is adapted for extending into the bore for a predetermined distance. The finger is resilient and movable between a first and second position. The first position has the protrusion protruding inwardly into the bore. The second position has the protrusion located outwardly of the bore. In the second position the outer surface is located radially outward relative to the first position.

A locking device may be selectively used to restrain the movement of the finger from the first position into the second position.

In one aspect of the invention, the locking device may be insertable between the finger and an outer member that may be a cylinder spaced from the hub. In this case, the finger is blocked by moving from its first position to its second position due to the presence of the locking device between the finger and cylinder.

DETAILED DESCRIPTION OF INVENTION

Figure 1:
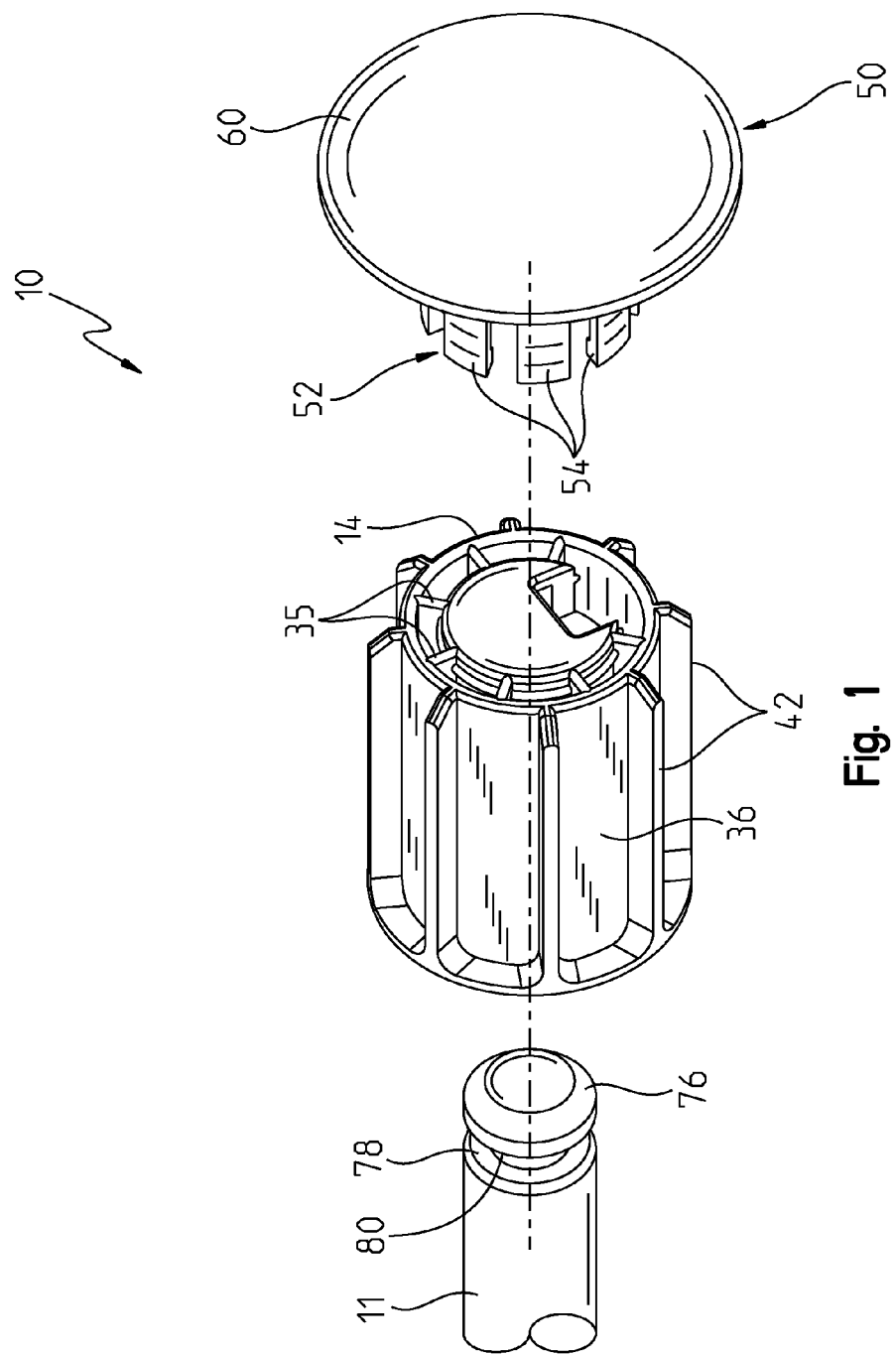
FIG. 1 is a perspective view of an exploded assembly of the hub, locking cap, and axle shaft.
Figure 2:
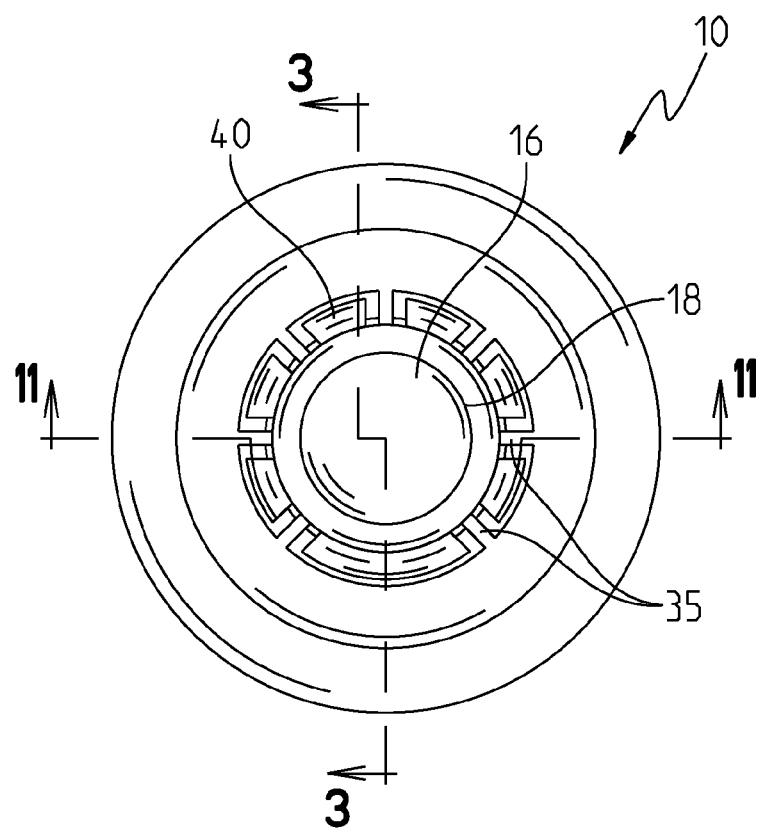
FIG. 2 is an inboard end view of the hub shown in FIG. 1.
Figure 3:
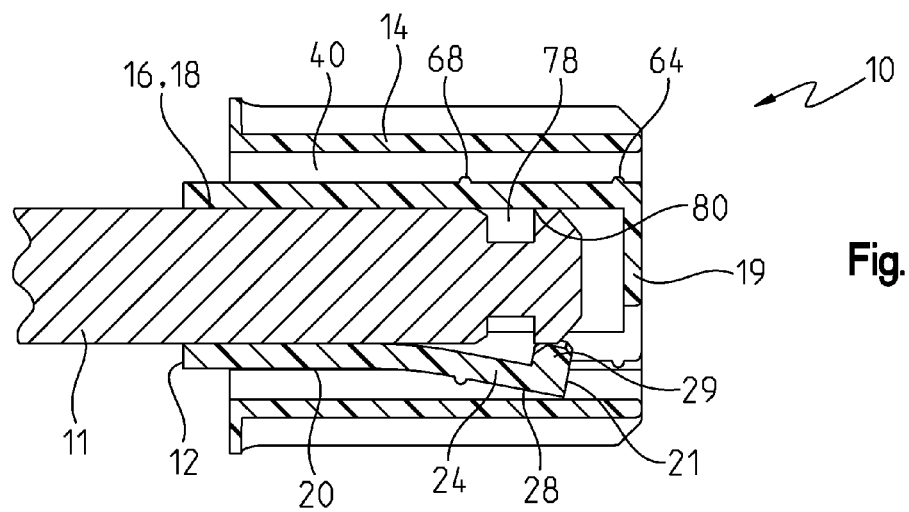
FIG. 3 is a sectional view of the hub taken about the line 3-3 in FIG. 2.
Figure 4:
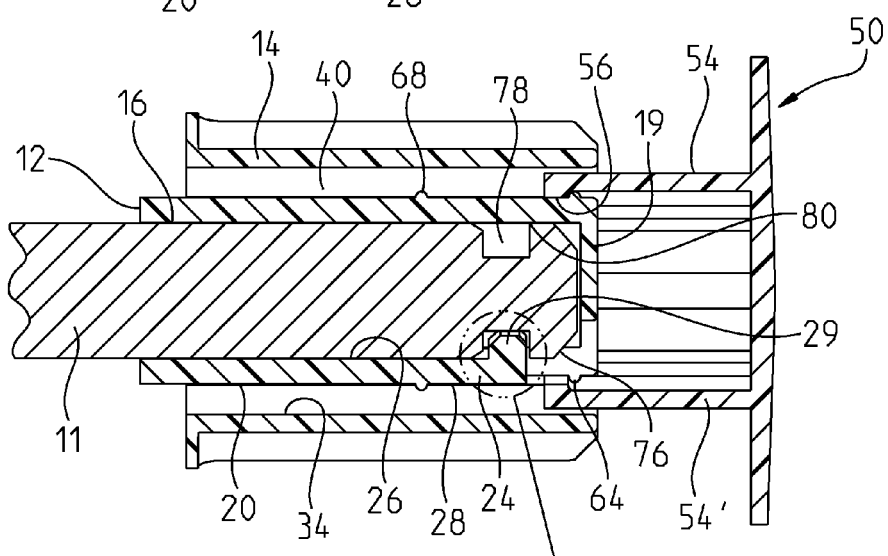
FIG. 4 is the section shown in FIG. 3 with the locking cap partially inserted into the hub.
Figure 4A:
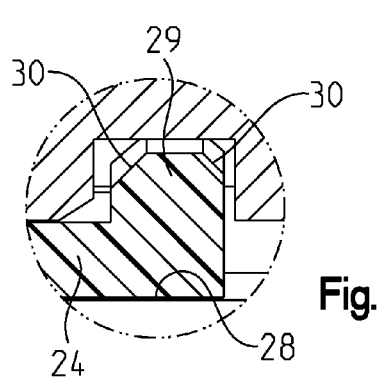
FIG. 4A is an enlarged view from area 4A in FIG. 3.

The locking hub 10 is shown in an exploded perspective view in FIG. 1. The locking hub 10 is particularly useful for securing a wheel to an axle shaft 11. The locking hub 10 has a hub 12 located within an outer cylinder 14. The hub 12, shown in sectional FIGS. 3-5, has a bore 16 with an inner diameter 18. The bore 16 terminates at an end wall 19. The hub 12 has an outer surface 20 that is coaxial with said inner diameter 18 of said bore 16. A finger 24 is cantilievered adjacent to the bore 16. The finger 24 has a connected end 23 and a free end 21. The finger 24 has a curved inner surface 26 that faces the bore 16 and an outer surface 28. The inner and outer surfaces 26, 28 are curved with the same radius as the inner diameter and outer surface 18, 20 of the hub 12 respectively. The connected end 23 of the finger 24 farther from the end wall 19 is integrally molded into the hub 12 to form a continuous connection at the connected end 23 of the finger 24. A protrusion 29 extends from the inner surface 26 of the finger 24 near its free end 21. The corners of the protrusion 29 have chamfers 30. FIG. 4 shows the finger 24 in a first position. In this first position, the protrusion 29 extends inwardly into the bore 16, and the inner surface 26 of the finger 24 is at the same level and curvature as the rest of the inner diameter 18 of the bore 16. In the first position, the outer surface 28 of the finger 24 is at the same level as the outer surface 20 of the hub or, in other words, the finger 24 is aligned with the hub 12. The protrusion 29 has chamfers 30 on its inboard and outboard sides. The inboard side referring to the left in FIGS. 3-5, and the outboard side referring to the right side in the same FIGS. The term inboard more generally means toward the inner part of the shaft 11, and outboard means toward the end of the shaft 11. Because the end of the shaft is shown toward the right in FIGS. 3-5, outboard is right and on the opposite end of the shaft 11, that is not shown, outboard would be left. A second position of the finger is shown in FIG. 3. In this position, the protrusion 29 is moved out of the bore 16 and the outer surface 28 is moved radially outward from the first position. As can be seen in FIG. 3, the outer surface 28 of the finger 24 is above the outer surface 20 of the hub 12. In other words, the finger 24 is not aligned with the hub 12 in its second position.

The locking hub 10 has an outer cylinder 14 that is concentric with the hub 12. The outer cylinder 14 has an inner surface 34 and an outer surface 36. The outer cylinder is supported on the outside of the hub 10 by a series of spokes 35. The spokes 35 run longitudinally in the annular space 40 between the outer cylinder 14 and outer surface 20 of the hub 12. The spokes 35 are spaced so that movement of the finger 24 into its second position is not restricted by the spokes 35. As can be seen in FIG. 3, the outer surface 28 of the finger 24 nearly touches the inner surface 34 of the outer cylinder 14. The outer surface 36 of the outer cylinder 14 has a series of splines 42 extending from it. It is contemplated that the inner surface 34 of the cylinder can be an integral part of a wheel as shown in FIG. 8. In the embodiment shown in FIG. 8, the hub 10 is an integral feature of the wheel 46 and is typically injection molded at the same time as the rest of the wheel 46 in one process. The functioning of the hub 10 in this embodiment is exactly the same as that shown in the FIGS. 1-7 and FIG. 10, and it is the wheel 46 itself that defines the outer surface 36.

Figure 5:
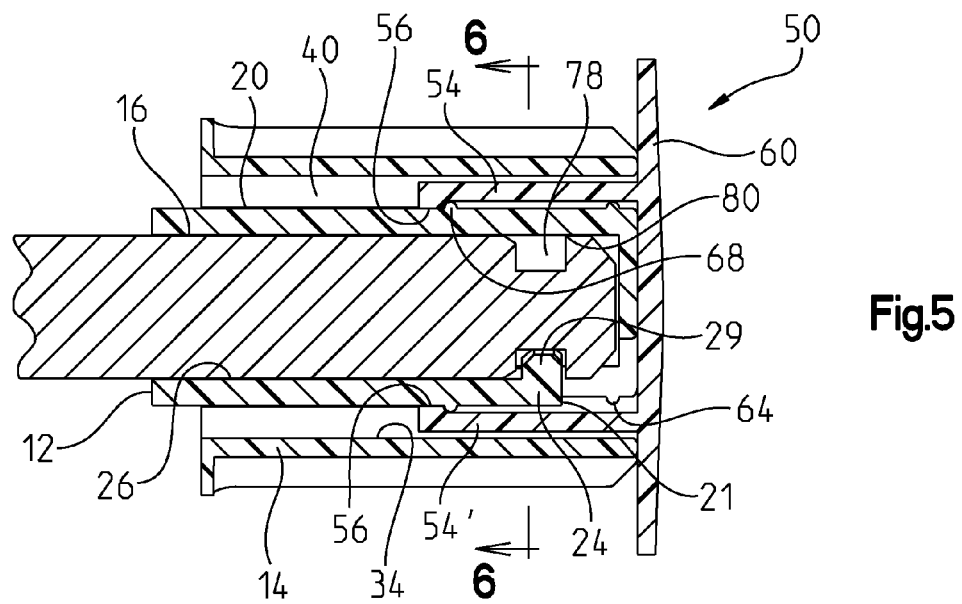
FIG. 5 is the section shown in FIG. 3 with the locking cap fully inserted into the hub.
Figure 6:
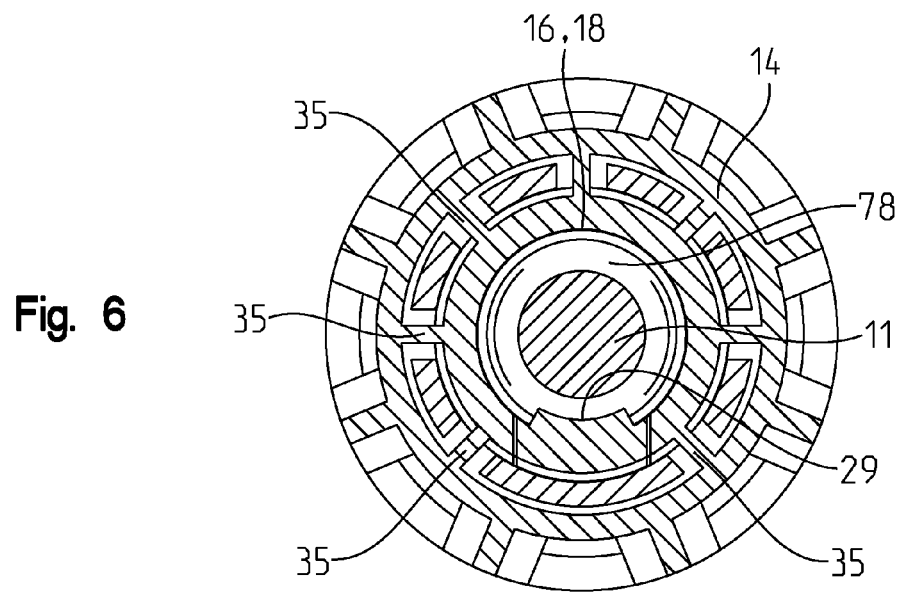
FIG. 6 is sectional view taken about the line 6-6 in FIG. 5.
Figure 7:
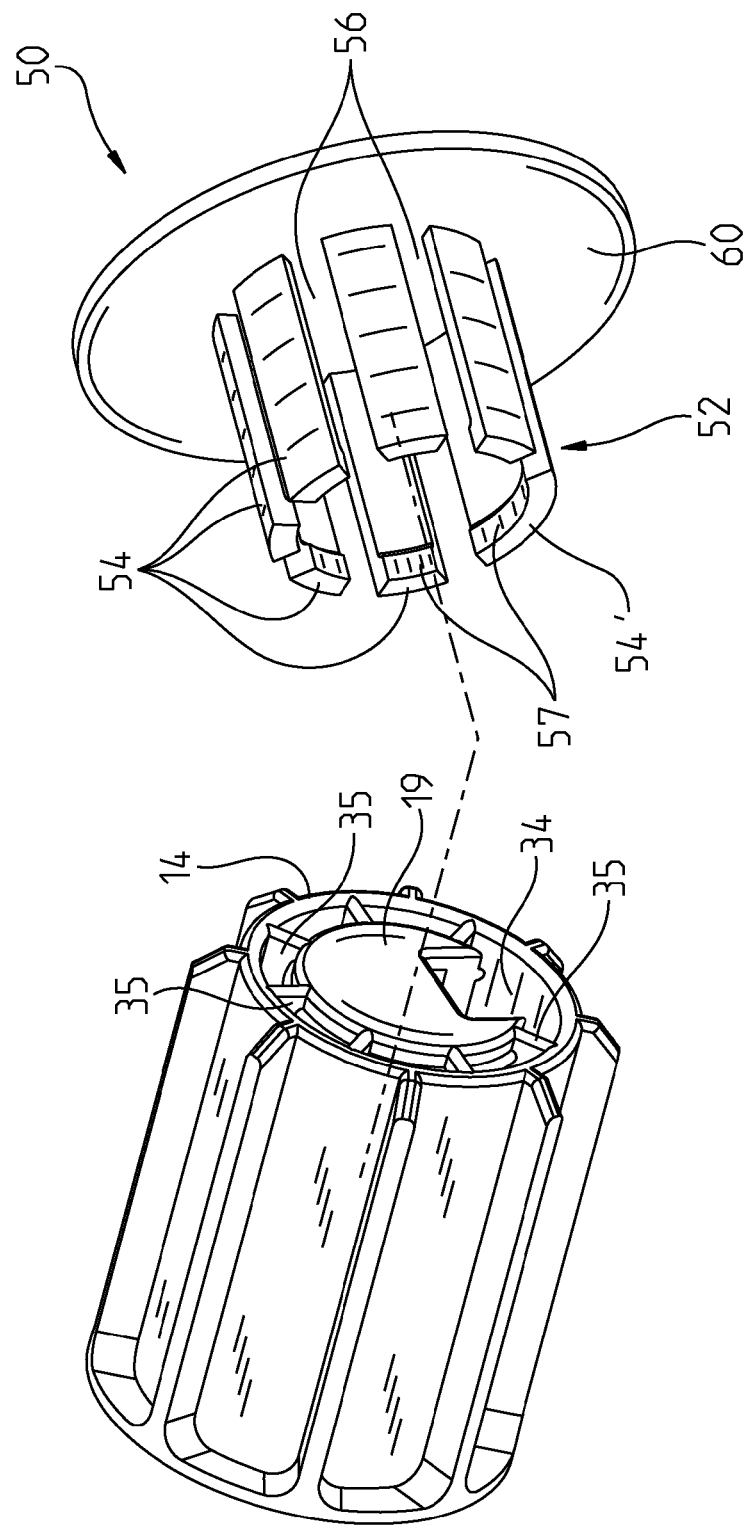
FIG. 7 is a perspective view of the hub and locking cap shown in FIG. 1 more clearly showing the tabs on the locking cap.
Figure 8:
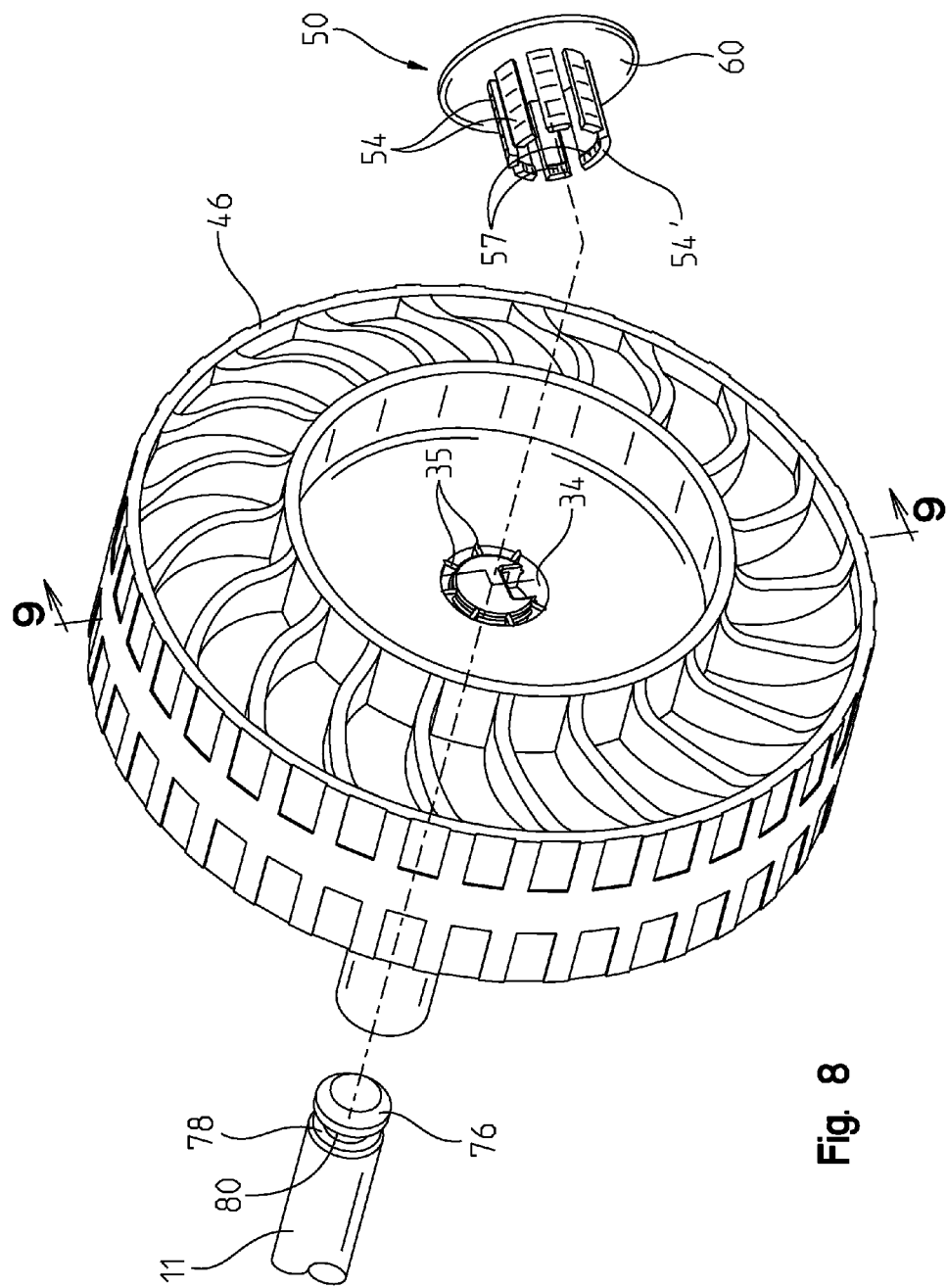
FIG. 8 is a perspective view of an exploded assembly of the hub integrated into a wheel, a locking cap, and axle shaft.
Figure 9:
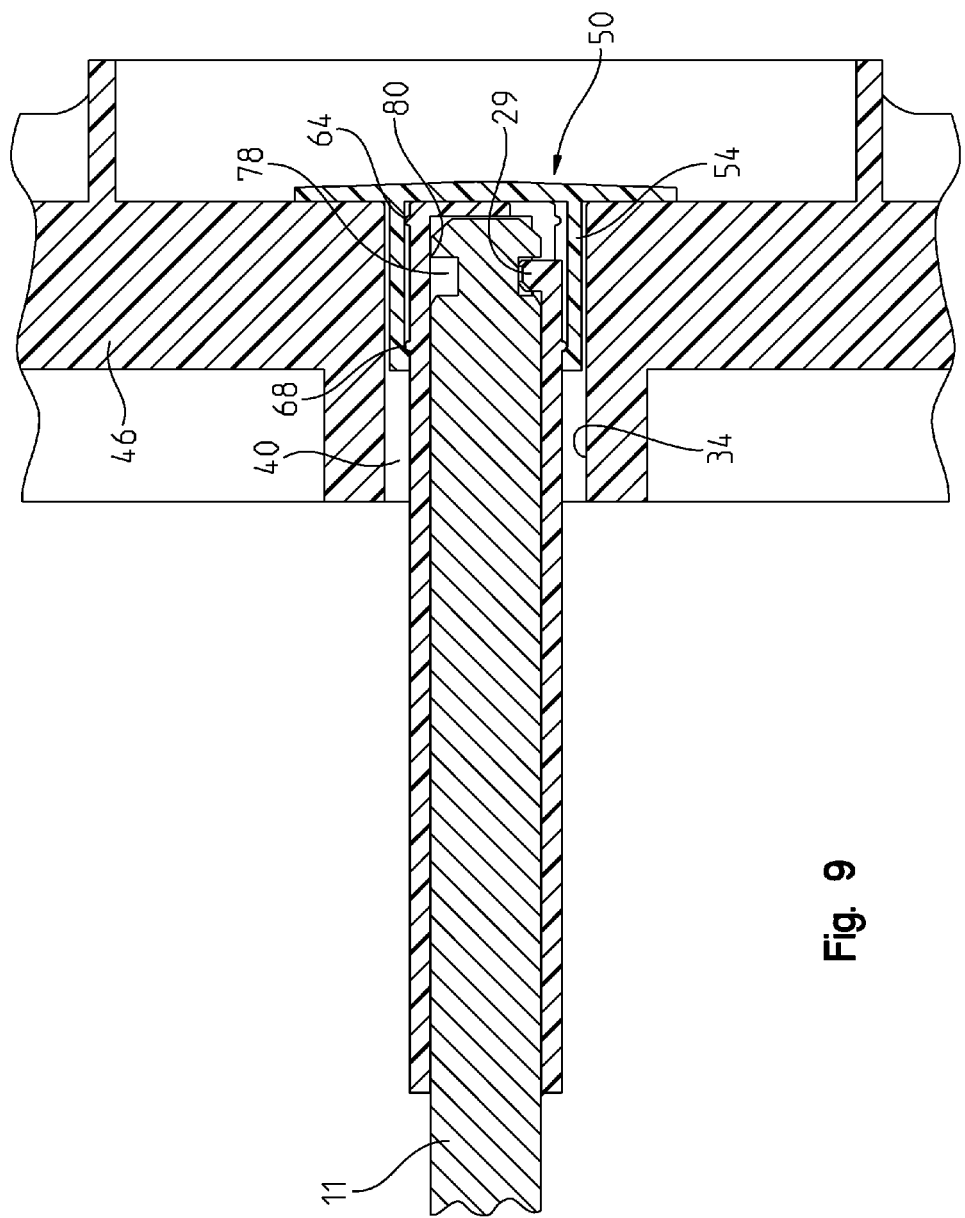
FIG. 9 is a sectional view taken about the line 9-9 in FIG. 8.

An insertable cap 50 is shown in FIG. 7 and is adapted for mating with the hub 10. The cap 50 has an insertable portion 52 that has a series of tabs 54 extending from the cap as shown in FIG. 7. Adjacent tabs 54 define slots 56 between them. The tabs 54 are adapted for being inserted in the annular space 40 between the outer surface 20 of the hub 12 and the inner surface 34 of the outer cylinder 14. FIGS. 4 and 5 show the cap 50 being inserted into the space 40. Each tab has a ridge 57 near its respective end. The ridges 57 on the tabs 54 protrude inwardly. The tabs 54 are resiliently cantilevered onto a base 60. A finger tab 54' is adapted for insertion between said finger 24 and said inner surface 34.

FIG. 3 shows a section of the hub 10 without an integrally cast wheel circumscribing the hub 12. The tabs 54 are shown extending partially into the annular space 40. An outboard collar 64 stands raised above the outer surface 20 of the hub 12. The outboard collar 64 extends all around the hub 12 with the exception of the portion of the hub 12 where the finger 24 is located. The tabs 54 are shown inserted just beyond the outboard collar 64 so that the ridges 57 are beyond the outboard collar 64. The tabs 54 being resilient and cantileivered are biased inwardly toward the center of the hub 12 so that when the tabs 54 are inserted into the annular space 40, the ridges 57 will contact the outer surface 20 of the hub 12. To move the ridges 57 past the outboard collar 64 requires enough force to bend the tabs 54 as the ridges 57 pass over the collar 64. Thus, when the tabs 54 are partially inserted into the annular space, some force will be required to remove the cap 50 from the hub 10. The outboard collar 64 is positioned so when the ridges 57 are inboard of the collar 64 and contacting said collar 64, tab 54' will not be positioned between the outer surface 28 of the finger 24 and the inner surface 34.

FIG. 5 shows a section of the hub 10 with the cap 50 fully inserted. With the cap 50 in this position, the ridges 57 are located inboard of an inboard collar 68. The inboard collar 68 extends all around the hub 12 with the exception of the portion of the hub where the finger 24 is located. The inboard collar 68 is positioned so that when the ridges 57 are contacting the inboard side of collar 68, the base 60 of the cap rests on the end of the hub as shown in FIG. 5. Similar to the outboard collar 64, some force is required to move the tabs 54 over the inboard collar 68. As such, some force is required to dislodge the cap 50 from the position shown in FIG. 5. Throughout the process of inserting the tabs 54 of the cap 50, no rotation of the cap 50 occurs, only axial movement.

Figure 10:
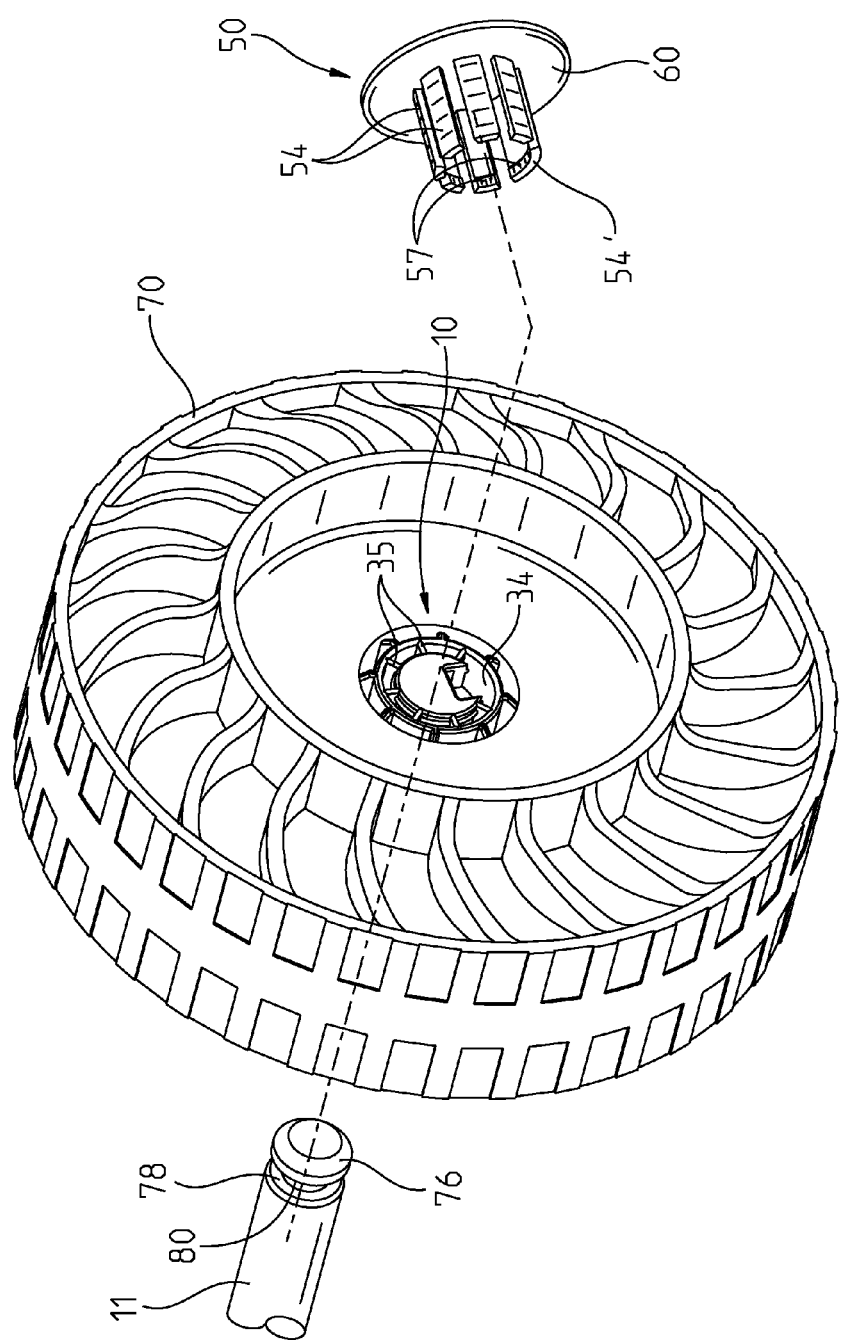
FIG. 10 is a perspective view of a wheel with a hub as shown in FIG. 1 press fit into the wheel.
Figure 11:
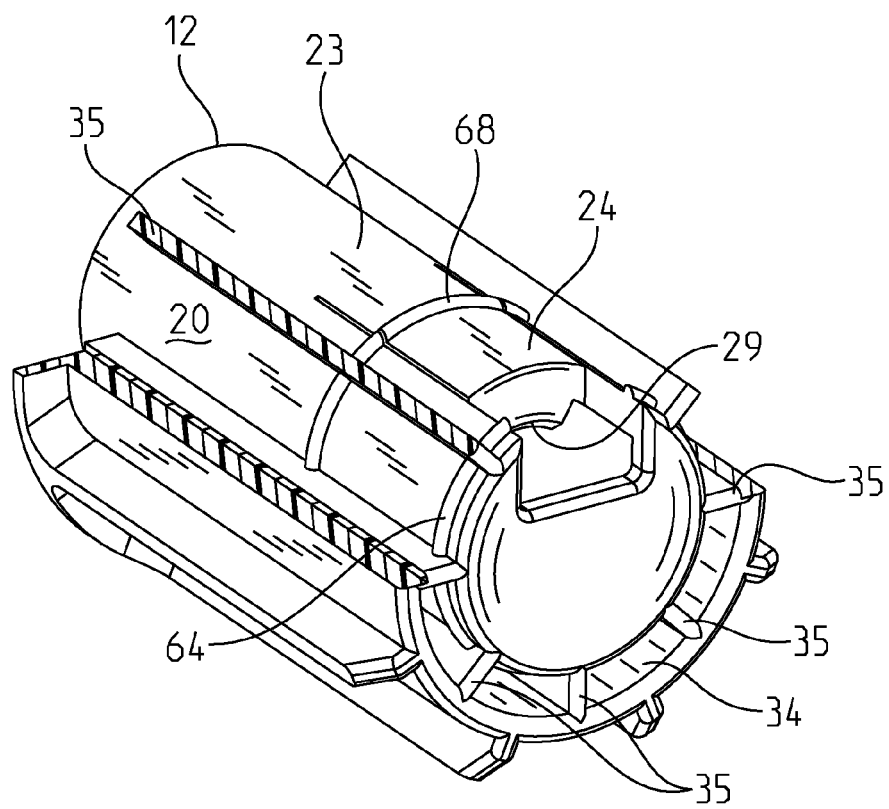
FIG. 11 is a sectional view taken about line 11-11 in FIG. 2.

When a user of the hub 10 wishes to install a wheel 46 on an axle shaft 11 he will first insert the axle 11 into the bore. FIG. 8 shows the integral hub that is cast into the wheel 46, and FIG. 10 shows a wheel 70 with the hub 10 press fit into a wheel 70. The shaft 11 has a chamfer 76 on its end and a notch 78 near its end. Although the notch 78, shown in FIGS. 1, 3-5, 8 and 10, is a 360 degree notch, a hole or partial notch could serve the same function. When the chamfer 76 passes by the protrusion 29 on the finger 24, the shaft 11 will push the finger 24 into its second position shown in FIG. 3. Once the shaft 11 is fully inserted into the bore 16 with the shaft contacting the end wall 19, the finger 24 will return to its first position, and the protrusion will extend into the bore 16 and be captured within the notch 78. If the shaft 11 is pulled out of the bore 16, it will move the finger 24 back into its second position before the shaft can be removed from the bore 16. To prevent the shaft 11 from leaving the bore 16, the finger can be restrained from moving into its second position. To prevent the wheel 46, 70 from coming off the shaft 11, the cap 50 is inserted into the space 40 between the hub 12, and the inner surface 34. The tab 54' adjacent to the finger 24 occupies the space 40 so that the finger 24 cannot move radially outward and therefore, the protrusion 29 remains extending into the notch 78 within the bore 16. The user will be certain the wheel 46, 70 is locked onto the shaft 11 when the base 60 of the cap rests on the hub 12, as shown in FIG. 5. If it is desired to remove the wheel at a later time, the cap 50 may be pulled partially out into the position shown in FIG. 4, and the wheel 46, 70 may be removed. Due to the chamfers 30 on the protrusion 29, as the wheel is pulled off of the shaft 11, the sharp corner 80 in the notch 78 will not catch the protrusion 29 in a way that would prohibit the finger 24 from moving into its second position to facilitate removal of the wheel. The cap 50 will be retained within the hub 10 in the wheel 46, 70 because the ridges 57 on the tabs 54 will catch on the outboard collar 64. Because the cap 50 can remain captured within the hub 10, wheels 46, 70 may be shipped with the cap 50 partially installed in the position of FIG. 4. It is also possible to ship hubs 10 as shown in FIG. 1 that may be later press fit into a wheel 70 with the cap 50 partially installed.

The invention is not limited to the details above, but may be modified within the scope of the following claims.

What is claimed is:

1. A locking hub comprising:
   a hub adapted for fitting over an end of a shaft, said hub including a bore having an inner diameter for receiving a shaft and an outer surface;
   a finger adjacent to said bore having an inner surface and an outer surface, said finger including a protrusion having a raised surface relative to said inner surface of said finger, said finger being adapted for extending into said inner bore, said finger being resilient and movable between a first and second position, said first position having said protrusion protruding inwardly into said bore, said second position wherein said protrusion is located outwardly of said bore and said outer surface of said finger is radially outward relative to said first position; and
   a locking device to actively restrain movement of said finger from said first position into said second position; wherein said hub includes an outer member connected to said hub and spaced outwardly from said finger, said locking device having an insertable portion adapted for insertion between said finger and said outer member whereby said finger is prevented from moving into said second position; wherein said insertable portion includes a ridge, said ridge adapted for catching on an outboard collar on said outer surface of said hub wherein said outboard collar is outboard of said finger.

2. A locking hub as claimed in claim 1, wherein said hub includes an inboard collar on said outer surface of said hub being inboard of said outboard collar, said ridge adapted for catching on said inboard collar.

3. A locking hub as claimed in claim 2, wherein said outer member is an outer cylinder circumscribing said hub.

4. A locking hub as claimed in claim 3, wherein said outer cylinder is supported on said hub by a plurality of spokes, said insertable portion of said locking device being slotted to accommodate said spokes when said insertable portion is placed over said hub.

5. A locking hub as claimed in claim 1, wherein said finger is biased toward said first position.

6. A locking hub comprising:
   a hub adapted for fitting over an end of a shaft, said hub including a bore having an inner diameter for receiving said shaft and an outer surface;
   an outer member connected to and spaced from said hub;
   a finger adjacent to said bore having an inner surface and an outer surface, said finger including a protrusion having a raised surface relative to said inner surface of said finger, said finger being adapted for extending into said bore, said finger being resilient and movable between a first and second position, said first position having said protrusion protruding inwardly into said bore, said second position wherein said protrusion is located outwardly of said bore and said outer surface of said finger is radially outward relative to said first position, and
   a locking device for selectively restraining movement of said finger from said first position into said second position, said locking device having an insertable portion adapted for insertion between said finger and said outer member, whereby said finger is prevented from moving into said second position; wherein said outer member is a cylinder circumscribing said hub and said finger being resiliently biased toward said first position; wherein said insertable portion includes a ridge, said ridge adapted for catching on an outboard collar on said outer surface of said hub.

7. A locking hub as claimed in claim 6, wherein said hub includes an inboard collar on said outer surface of said hub being inboard of said outboard collar, said ridge adapted for catching on said inboard collar whereby some force is required to move said ridge past said inboard collar.

8. A locking hub as claimed in claim 7, wherein said outer cylinder is supported on said hub by a plurality of spokes, said insertable portion of said locking device being slotted to define tabs insertable between said spokes.

9. A locking hub as claimed in claim 8, wherein said outer cylinder is defined by a wheel.

10. A locking hub for use in combination with an axle shaft having a notch, said locking hub comprising:
    a hub adapted for fitting over an end of said shaft, said hub including a bore having an inner diameter for receiving said shaft and an outer surface;
    an outer member connected to and spaced from said hub;
    an annular space formed between said outer surface of said hub and said outer member;
    a finger adjacent to said bore having an inner surface and an outer surface, said finger including a protrusion having a raised surface relative to said inner surface of said finger, said finger being adapted for extending into said bore and said protrusion being adapted for being received in said notch, said finger being resilient and movable between a first and second position, said first position having said protrusion protruding inwardly into said bore, said second position wherein said protrusion is located outwardly of said bore and said outer surface of said finger is radially outward relative to said first position; and
    a locking device for selectively restraining movement of said finger from said first position into said second position, said locking device having an insertable portion adapted for insertion in said annular space whereby said finger is prevented from moving into said second position.

11. A locking hub as claimed in claim 10, wherein said finger is cantilevered adjacent to said bore having a connected end and a free end, said finger being substantially aligned with said bore when said finger is in said first position, said outer surface of said finger being raised from said outer surface of said hub when said finger is in said second position.

12. A locking hub as claimed in claim 11, wherein said outer member is supported by a plurality of spokes connected to said hub, said insertable portion of said locking device is slotted to form tabs, one of said tabs being insertable between said finger and said outer member.

13. A locking hub as claimed in claim 12, wherein said insertable portion includes a ridge, said ridge adapted for catching on an outboard collar on said outer surface of said hub.

14. A locking hub as claimed in claim 13, wherein said hub includes an inboard collar on said outer surface of said hub being inboard of said outboard collar, said ridge adapted for catching on said inboard collar ridge past said inboard collar.

* * * * *